United States Patent [19]

Huber et al.

[11] Patent Number: 5,327,014
[45] Date of Patent: Jul. 5, 1994

[54] FIRING CONTROL DEVICE FOR TRIGGERING A PASSENGER RESTRAINT SYSTEM OF A VEHICLE

[75] Inventors: Anton Huber, Regensburg; Dieter, Neugebauer, Regenstauf; Marten, Swart, Regensburg, all of Fed. Rep. of Germany

[73] Assignee: Siemens Aktiengesellschaft, Munich, Fed. Rep. of Germany

[21] Appl. No.: 956,019

[22] PCT Filed: Aug. 9, 1991

[86] PCT No.: PCT/EP91/01524
§ 371 Date: Dec. 7, 1992
§ 102(e) Date: Dec. 7, 1992

[87] PCT Pub. No.: WO92/03311
PCT Pub. Date: Mar. 5, 1992

[30] Foreign Application Priority Data

Aug. 22, 1990 [DE] Fed. Rep. of Germany ..... 90116107

[51] Int. Cl.$^5$ ............................................. B60R 21/32
[52] U.S. Cl. .................................. 307/10.1; 180/282; 280/735; 340/438
[58] Field of Search ...................... 307/9.1, 10.1, 10.6; 340/669, 436, 438, 440; 280/735, 734, 728; 180/271, 174, 282; 324/727, 527; 73/1 D, 1 DV, 652, 510, 514, 518, 649

[56] References Cited

U.S. PATENT DOCUMENTS

| | | | |
|---|---|---|---|
| 3,890,594 | 6/1975 | Hosaka et al. | 180/274 |
| 3,964,016 | 6/1976 | Yamada et al. | 340/436 |
| 4,381,829 | 5/1983 | Montaron | 280/735 |
| 4,835,513 | 5/1989 | McCurdy et al. | 340/436 |
| 4,933,570 | 6/1990 | Swart et al. | 307/10.1 |
| 4,968,965 | 11/1990 | Naitou et al. | 340/436 |
| 4,990,884 | 2/1991 | McCurdy et al. | 340/438 |
| 4,992,943 | 2/1991 | McCracken | 340/436 |
| 5,178,409 | 1/1993 | Hiramitsu et al. | 280/735 |
| 5,216,607 | 6/1993 | Diller et al. | 280/735 |
| 5,225,985 | 7/1993 | Okano | 280/735 |

FOREIGN PATENT DOCUMENTS

0027747 4/1981 European Pat. Off. .
0284728 10/1988 European Pat. Off. .
62-322679 12/1987 Japan .
WO 91/05680 5/1991 PCT Int'l Appl. .

Primary Examiner—A. D. Pellinen
Assistant Examiner—Richard T. Elms
Attorney, Agent, or Firm—Hill, Steadman & Simpson

[57] ABSTRACT

A firing control device (G) for triggering a passenger restraint system of a vehicle by electrically firing one or more firing pellets (Z1, Z2), having a processor (P) which, during operation, criteria for the necessity of triggering derives from the output signals of one or more crash sensors (S1, S2), having at least one measuring unit (R/DR, DZ1, DZ2) which, during a crash, measures at least the firing current (I1, I2) flowing through the respective firing pellets (Z1, Z2) and/or values (for example voltages) which depend on said firing current (I1, I2), having a PROM memory (M), and having a measuring unit (R/DR) which (R/DR) contains a measuring resistor (R) which is inserted into the firing circuit (I1, I2) of the firing pellet (Z1, Z2) so as not to be usually directly accessible from the outside via external terminals (A0 to A5) of the housing (G) of the firing control device in order to determine data relating to the variation of the firing current (I1, I2) flowing across the resistor (R) during triggering. In the event of a crash, data, from which it can later be detected whether and how the passenger restraint system triggered during the crash, is written into the PROM memory (M), the data in fact being at least some of the data which relates to the criteria derived by the processor (P) during the crash, and the measuring unit (R/DR, DZ1, DZ2), the processor (P), the measuring unit (R/DR, DZ1 and/or DZ2) and the PROM memory (M), but no firing pellet (Z1, Z2) and also no explosive charge of the passenger restraint system, being mounted in the housing (G) which survives a crash intact and cannot be opened without leaving behind detectable damage.

10 Claims, 1 Drawing Sheet

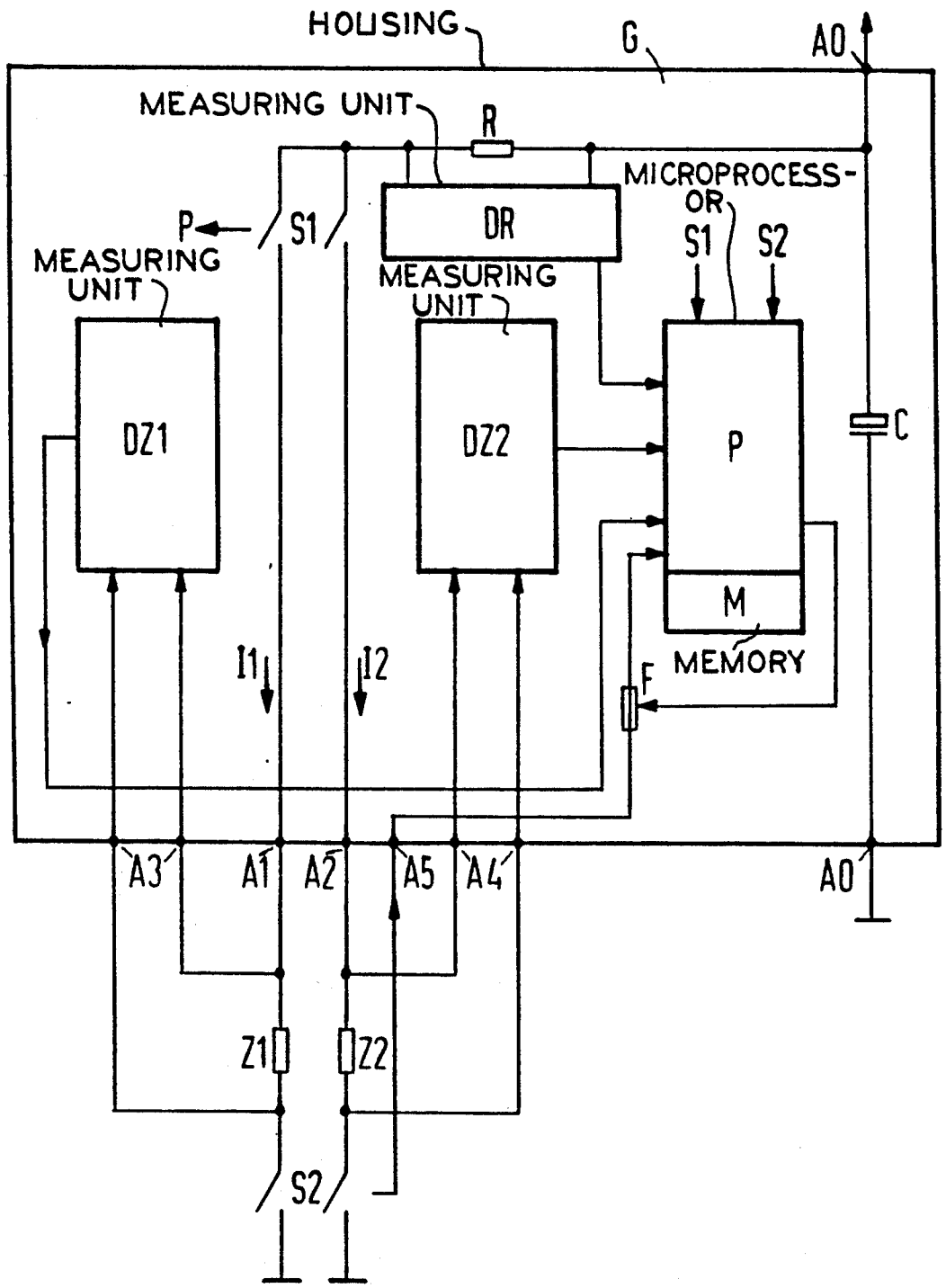

FIRING CONTROL DEVICE FOR TRIGGERING A PASSENGER RESTRAINT SYSTEM OF A VEHICLE

BACKGROUND OF THE INVENTION

Firing control devices for triggering a passenger restraint system of a vehicle, that is to say for example for triggering an explosive charge of an air bag and/or roll bar and/or safety belt retractor system of a motor vehicle by electrically firing one or more firing pellets are known per se in large numbers.

The invention is based on the specific firing control device which is known from European reference EP-A2-027 747 corresponding to U.S. Pat. No. 4,381,829. However, the invention can be used not only on the firing control device described in this publication, and the further developments of this device, but also on all firing control devices as defined above.

A similar firing control device which however does not contain a memory for storing the data which is determined in the event of a crash by means of a measuring resistor of a measuring unit is described for example by means of the non-prepublished PCT Application PCT/DE 90/00125=WO 91/05680 (corresponding to U.S. Ser. No. 844,642 filed Mar. 31, 1992.

In addition, accident data printers for vehicles, in particular for airplanes, are generally known.

Although the invention was developed in particular for a motor vehicle, for which it is particularly suitable, it has become evident that the invention is also suitable for other vehicles which are equipped with a passenger restraint system which is to be triggered electrically.

SUMMARY OF THE INVENTION

The objective is as follows:
to store data, which can be subsequently evaluated, relating to the triggering brought about by a crash, so securely that, subsequently, the stored data can no longer be readily secretly falsified by tampering—for example by subsequent firing or by subsequent simulation of a crash criterion,
thus to enable non-falsified data after a crash relating to the triggering to be made available for example to judges, traffic experts, motor vehicle manufacturers, motor vehicle suppliers and road planners and to permit subsequently falsified data to be recognized as such.

The object of the present invention is achieved by a firing control device for triggering a passenger restraint system of a vehicle by electrically firing one or more firing pellets, having:
a processor which, during operation, derives criteria for the necessity of triggering from the output signals of one or more crash sensors;
a measuring unit, which measures, during a crash, at least one value (for example voltages) which depends on the firing current flowing through the respective firing pellet;
a measuring resistor in the measuring unit, which resistor is inserted into the firing circuit of the firing pellet in order to determine data relating to the variation of the firing current flowing across this resistor during triggering or data which is dependent thereon;
a memory which constitutes a PROM memory, for storing specific data which is determined in the case of a crash and from which it can later be detected whether and how the passenger restraint system triggered during the crash, namely for storing at least some of the data determined which relate to the criteria derived by the processor during a crash, and at least some of the data determined by means of the measuring unit/units;
the measuring resistor being inserted into the firing circuit/circuits of the firing pellet/pellets in such a way that it is usually not directly accessible from the outside via external terminals of the housing of the firing control device; and
the processor, the measuring unit/units and the PROM memory, but no firing pellet and also no explosive charge of the passenger restraint system, being mounted in the housing which survives a crash intact and which cannot be opened without leaving behind detectable damage.

Therefore, the objective of the invention has two main aspects: firstly, data relating to the crash and to the triggering of the passenger restraint system is to be correctly detected or measured and then permanently stored and, secondly, subsequent secret tampering with the stored data is to be made as difficult as possible or made impossible. The following are advantageous developments of the present invention.

The housing has external electrical terminals, specifically the terminals of the power supply of the components provided in the housing and the terminals via which the pellet/pellets are fired. However, these are not terminals via which the data relating to a crash and stored in the PROM memory can be falsified directly, or indirectly (for example via a measuring unit mounted outside the housing) from outside the housing without leaving behind data in the PROM memory which would indicate tampering. This makes it even more difficult for the stored data to be subsequently falsified by tampering. The housing has one or more external processor terminals via which output signals of one or more crash sensors not mounted in the housing are fed to the processor during operation in order to derive the criteria. However; the connection between the respective external processor terminals and the processor is immediately and permanently broken as soon as, after triggering, the processor no longer has to process any further output signals of the respective crash sensor/sensors and before the stored data can be tampered with. The respective connection is therefore permanently broken at most several seconds (for example 0.1 seconds) after triggering. This permits the processor to be fed data for the derivation of criteria right up to the end of the main phase of the crash via external processor terminals of the housing from the outside, namely from a crash sensor, without it being possible for the data then stored to be tampered with later via these external processor terminals after a crash or after a triggering. The housing contains at last one crash sensor from whose output signals the processor derives criteria. This crash sensor contains a switching path which is actuated by this crash sensor itself and which is located in series with at least one measuring resistor for switching the firing current. This makes it difficult to tamper with the stored data.

After the detection of the necessity of triggering the passenger restraint system, its processor itself actuates one or more switches which switch on the firing current which flows through the firing pellet/pellets. This also makes it more difficult to externally tamper with the stored data. The housing contains a crash sensor from whose output signals the processor derives criteria. However, the housing also contains a switch which is directly controlled only by the processor, but not directly by the crash sensor, and which switches the firing current and which is located in series with at least one of the measuring resistors. This makes it more difficult to tamper with stored data which relate to the respective crash sensor mounted in the housing. The housing contains one or more firing capacitors which store the electrical energy necessary for firing. This permits sufficient energy to be made available locally to fire the firing pellets.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single figure is a block diagram depicting the firing control device of the present invention.

DESCRIPTION OF THE PREFERRED EMBODIMENT

The invention and further developments of the same are explained further by means of the diagram of an exemplary embodiment shown in the figure.

The figure shows by way of example that two firing pellets Z1, Z2 for explosive charges are connected to the firing control device—in the invention always outside the housing G—and, for their part, in the event of a crash for example inflate air bags, activate a roll bar and/or drive safety belt retractors. The housing G of the firing control device in the invention therefore does not contain the explosive charges of the passenger restraint system either. Within the scope of the invention, "firing control device" is taken to mean only the housing G together with those components—for example P, S1, etc.—which are mounted within the housing G.

The housing G contains the processor P, for example a microprocessor P which, during operation, derives criteria for the necessity of triggering from the output signals of one or more crash sensors, such as the crash sensors S1 and S2 containing, here, two respective switching contacts. These crash sensors can in principle be mounted inside or outside the housing G, such as the crash sensor S1 mounted in the housing G in the example shown, and the crash sensor S2 mounted in this case outside the housing G.

The example shown has two separate sensors S1, S2 with in each case two contacts which in the event of a crash fire the firing pellets Z1, Z2 directly. The processor P, which can be for example a microprocessor P, monitors the output signals of the crash sensors S1, S2—possibly at the same time also directly monitoring the behavior of these contacts—in that during the crash the processor P derives criteria—at least from the variation of output signals of the crash sensor S1 and/or S2—for the necessity whether—and possibly also at what ideal time—the firing of the firing pellets Z1, Z2 should take place.

In order to avoid making the figure too unclear, it was assumed in the example shown that the crash sensors S1, S2 themselves directly fire the firing pellets Z1, Z2. However, the firing pellets Z1, Z2 will frequently not be fired directly by means of the contacts of the crash sensors S1, S2 but rather for example by means of the processor P, for example in accordance with the above mentioned PCT Application PCT/D 90/00125 (corresponding to U.S. Ser. No. 844,624): as is also described later, the processor P for its part then initially evaluates the output signals of the crash sensors S1, S2 and subsequently itself fires the firing pellets Z1, Z2 in accordance with its own current evaluation of these output signals at a time determined by itself, by the processor P—if the processor P then considers triggering at all necessary.

The objective of the invention is to store data, which can be subsequently evaluated, relating to the triggering brought about by a crash, so securely that, subsequently, the stored data can no longer be readily secretly falsified by tampering—for example by subsequent firing of firing pellets or by subsequent simulation of a crash criterion. In this way, it is to be namely possible after a crash—possibly even weeks and months after the crash—for the stored data to be read out in a non-falsified form by an expert in order for example to make available such data relating to the triggering, for example to judges, traffic experts, motor vehicle manufacturers, motor vehicle suppliers and road planners, or in order to permit subsequently falsified data to be recognized as such.

Subsequent tampering with the stored data, for example by subsequent firing of firing pellets Z1, Z2 or by subsequent overwriting of the stored data in the memory M, is therefore to be made as difficult as possible. Likewise, the subsequent simulation of the presence or non-presence of an output signal of a crash sensor and/or of a measuring unit measurement result is to be made as difficult as possible.

The invention achieves this objective by means of a combination of an entire series of measures:

A first main aspect of the objective of the invention is the correct detection or measurement and the permanent storage of data relating to the crash and to the triggering of the passenger restraint system.

In the invention, the processor P stores—additionally or exclusively—all or at least some of the crash criteria or sensor output signal evaluations, derived from the processor P, in a PROM memory M. In the PROM memory M, data is therefore to be stored which relates to how the output signals of the crash sensor proceeded, that is to say how the decelerations and movements of the vehicle proceeded during the crash. These stored data will later permit an expert to detect whether criteria, and if so which criteria, were present which made triggering necessary, in all events at a specific time.

However, in the memory M not only details relating to the sensor output signals but also data relating to the triggering itself, that is to say for example relating to the size of the firing currents, I1/I2, is to be stored which later—possibly even weeks and months after the crash—permit an expert also to detect whether and how the triggering controlled by the firing control device proceeded.

Therefore, in the invention at least two types of data are permanently stored in the housing G of the firing control device during the crash: firstly data relating to the criteria derived from the processor P and secondly data relating to the triggering of firing currents I1/I2, that is to say relating to the progression of the triggering of the firing current.

Therefore, the invention also contains in the housing G at least one single measuring unit, such as the measuring units DZ1 and DZ2 and DR which themselves measure more or less precisely during the crash whether and in detail how the firing control device triggered the passenger restraint system. These measuring units measure or determine—possibly also only in conjunction with the processor P—the respective data to be stored relating to details of the variation of the firing current flowing during triggering and/or relating to details of the variation of the voltages occurring during triggering, for example at the measuring resistor R. These measuring units therefore measure or determine during the crash, principally in its main phase and possibly also in its end phase, for example voltages via which, and/or currents I1/I2 by means of which, pellets Z1, Z2 are fired -or even values derived therefrom such as for example gradients of voltage edges and time integrals of such voltages and currents.

The data relating to the triggering of the firing current which is stored include at least individual items of the measured or determined data, for example such data which relate directly or indirectly to the maximum value and/or the variation of the triggered firing current I1/I2, and/or data which relate directly or indirectly to the variation of the corresponding firing voltage across the firing pellets Z1, Z2. Here, this data can be written as such —or for example processed by the processor P—into the PROM memory M. All this data to be stored can in principle be written into the PROM memory by the processor P, but also possibly directly by the measuring units DZ1, DZ2, R/DR.

These measuring units can be formed for example by a differential amplifier DZ1, DZ2 which measures the voltages across the firing pellets Z1, Z2 and/or by a differential amplifier DR which measures the voltage across a measuring resistor R, the measuring resistor R being inserted into the firing circuit inside the housing G. This measuring unit DR, or one of the measuring units DZ1, DZ2 can therefore additionally contain one or more measuring resistors R for measuring purposes, which resistors are inserted into the firing circuit/circuits of the firing pellet/pellets Z1, Z2 and supply data relating to the voltages occurring across the measuring resistor R during triggering or relating to details of the characteristic of these voltages which occur. Such a measuring resistor R can also be inserted into a common line section, of several or of all the firing pellets Z1, Z2 in order to supply data relating to the common behavior of the firing pellets Z1, Z2. As a result, the firing current I1/I2 actually becomes directly measurable—for example by means of a differential amplifier DR which firing current flows —depending on the circuit as the firing currents individually, or as shown in the figure as a mutual superposition of the firing currents I1+I2—via the respective measuring resistors R in the case of triggering.

All this data stored in the PROM memory M, for example relating to the current size of a current, is moreover preferably stored in the memory M, for example by means of the processor P, together with time information which relates to the respective time which has passed since the start of the crash. Thus, the expert can later determine and assess from the stored data particularly precisely how the crash proceeded and also whether the passenger restraint system operated satisfactorily during the crash—in accordance with the type and severity of the crash.

In the example shown, again in order to simplify the figure, also only a single capacitor C is shown as energy accumulator, which capacitor stores the energy required to fire the firing pellets Z1, Z2. However, for example in accordance with the application PCT/DE 90/00125 (corresponding to U.S. Ser. No. 844,642), mentioned above, a separate capacitor per firing pellet Z1, Z2 can also be provided in each case as energy store.

In addition to the permanent storage of the data, a second main aspect of the objective of the invention is to make difficult, or prevent entirely, subsequent secret tampering with the data stored in the PROM memory M.

The firing control device according to the invention is therefore always surrounded by a housing G which is as solid as possible, survives a crash and cannot be opened without leaving behind detectable traces of force.

In the invention, the housing G has as far as possible no controllable electrical external terminals via which the data stored in the memory after a crash, above all also the data relating to the triggering processes determined by means of the measuring unit, can be subsequently falsified in an inconspicuous fashion. With the invention, even indirect attempts at tampering with the stored data are made difficult if, after a crash, in particular the processor P cannot be made to falsify the data stored in the PROM memory M relating to a crash via one of the external terminals of the housing G.

At least one of the measuring units, such as R/DR, mounted in the housing G is usually hardly accessible in the invention from the outside via external terminals of the housing, A0 to A5, in order to make subsequent tampering difficult. For this purpose, in each case a switch S1 can be located between this measuring unit R/DR and the external terminal, A1/A2, which is most suitable, in the figure, switch S1 only becomes briefly conductive for the purpose of triggering under conditions which occur in the event of a crash.

Data which relates to the progression of the triggering and which it is virtually impossible to tamper with or falsify can be easily acquired and stored if a measuring unit—preferably provided inside the housing G—contains one or more measuring resistors R which is inserted into the firing circuit/circuits of the firing pellet/pellets Z1/Z2. Such a measuring resistor is hardly accessible from the outside for the purpose of tampering, the measuring resistor then supplying for the memory M data relating to the voltage occurring across the measuring resistor R during triggering or relating to details of the variation of these voltages which occur.

Because the firing pellets Z1, Z2 are mounted outside the firing control device, for the purpose of subsequent tampering it would be possible to attempt subsequently to fire these firing pellets after the crash. For this purpose, there are two variants:

If during this process these firing pellets Z1, Z2 are fired in such a way that no firing current I1 or I2 flows through the housing G, it can be detected from the data which continued to be stored in an unmodified form in the PROM memory M that the firing device itself did not fire the firing pellets Z1, Z2.

However, even if this firing current, I1 and/or I2 were conducted through the firing control device G during the tampering, according to the invention the data permanently stored in the PROM memory M enables it to be determined what actually occurred during the preceding crash and/or at least to be determined that the data stored in the PROM memory M has been tampered with. Therefore, according to the invention in the event of a crash not only is the most important data relating to the firing current I1/I2 and/or relating to the firing voltage and determined by measuring units—R/DR, DZ1, DZ2—permanently stored in the PROM memory M but also in addition at least some data which has been derived by the processor P from the output signals of the crash sensor S1/crash sensors S1/S2 during the crash—it being possible also to store, in addition to this data, in each case the associated time information in the PROM memory M. In the case of subsequent tampering, even with specific specialist knowledge all of this data for falsifying the stored data can in fact hardly ever be simultaneously simulated or produced by tampering and subsequently stored in an inconspicuous manner in the PROM memory M: data which is derived by the processor P from sensor output signals either during the crash or during tampering and stored, in fact hardly ever fit reasonably with this data which relate in particular to the triggering and the variation of the firing currents I1/I2 and which is supplied simultaneously by the measuring units. Only data which has not been tampered with fit together in a sufficiently reasonable manner only after a genuine crash which caused the firing control device to trigger or not to trigger. Decelerations, such as occur in a genuine crash, can also hardly ever be simulated in an inconspicuous manner, for example by shaking the housing G.

In order to make tampering with the stored data even more difficult, the smallest possible number of external electrical terminals can be mounted on the housing G, as shown in the figure. For example, preferably only external terminals A0, A1 and A2, can be mounted on the housing G, as shown in the figure, via which terminals the power is partially supplied, to A0, but via which at least usually no data which permit tampering can be entered.

There is no risk if the terminals A0 of the power supply of the components P, M, R/DR, DZ1, DZ2, S1 which are mounted in the housing G are provided as external electrical terminals. According to the invention, there is also no risk in providing the external terminals A1, A2 via which the firing pellet/pellets Z1, Z2 are fired, because, inter alia, the measuring unit R/DR, which is hardly ever accessible from the outside and with the aid of which the firing current I1, I2 is measured and data relating thereto is stored, is mounted in the housing G.

However, in principle the invention nevertheless permits external terminals from further measuring units, the external terminals A3 and A4 of the measuring units DZ1 and DZ2, to be provided, at least if the measuring unit, R/DR, which is not directly accessible from any other external terminal is additionally mounted in the housing G, which measuring unit also supplies data relating to the variation of the firing current I1/I2 for storage in the PROM memory M. In contrast: a comparison of the stored data which was supplied by the various measuring units, those accessible from the outside and those inaccessible from the outside, makes attempts at tampering very easy to detect without the non-falsified storage of the data of the measuring unit R/DR which is inaccessible from the outside being put at risk to any great extent. —In the figure, for the sake of clarity separate external terminals A1 and A2 are disclosed and next to them the external terminals A3 and A4, having in each case two terminal clamps, of the measuring units DZ1, DZ2 are provided separately.

However, because in each case one of the terminal clamps of the external terminals A3 and A4 is at the same potential as the external terminals A1 and A2 in the example shown, the number of external terminals of the example shown can be reduced without the function of the firing control device being disturbed: in fact, it is possible—by means of an appropriate modification of the wiring inside the housing G—in each case also to directly replace these respective terminal clamps of the external terminals A3 and A4 by providing the external terminals A1 and A2 only.

In principle, the invention even permits one or more electrical external processor terminals A5 to be provided on the housing G, via which terminals A5 the output signals of one or more crash sensors S2, which are not mounted in the housing G, are fed to the processor P during operation, above all during the crash up to the end of the main phase of the crash, so that the processor P can also derive therefrom criteria relating to the necessity of triggering. It may then initially still be a concern that a person skilled in the art who is well informed about the invention could subsequently secretly tamper by means of this external processor terminal A5 with the stored data relating to the crash and the triggering. However, security against this subsequent tampering can be additionally increased if in each case a protection F is inserted into the connection A5-P between the respective external processor terminals, A5, and the processor P, which protection is permanently broken immediately after the crash by the processor P. This protection F can immediately break the respective connection A5-P permanently as soon as, after triggering, the processor P no longer has to process any further output signals of the respective externally provided crash sensor/crash sensors S2. This protection F can therefore then break the connection for example after 0.1 seconds—but generally at the latest several seconds after triggering. Moreover, this protection F can also be formed by a corresponding program section in the program memory of the processor P and have the equivalent blocking function on the respective processor input as a hardware protection F.

It is easy to make tampering with the stored data more difficult if the housing G itself also contains at least one crash sensor, S1, from whose output signals the processor P derives criteria. It is thus even more difficult for a person attempting to tamper to simulate output signals of this crash sensor S1 which is provided internally than if the housing G only has one externally provided crash sensor S2 and one external processor terminal A5.

The firing control device according to the invention, which device operates with a crash sensor S2 provided outside the housing G, is particularly secure if this housing G additionally has its own crash sensor S1 inside it. Then, subsequent tampering can then in fact be detected also from contradictions between the data stored for the crash sensor S1 and for the crash sensor S2.

External access to the stored data with a view to tampering can also be made difficult if switches S1 whose switching paths are only activated to trigger the firing current I1/I2 are located in series with the measuring resistor R in the housing G. These switches S1 can in principle already be formed by the switching paths of a crash sensor S1, as depicted in the figure.

In addition, it is therefore possible, and requires a particularly small amount of expenditure, if the crash sensor S1 mounted in the housing G contains in each case one switching path S1, actuated by said sensor itself, for connecting the firing current I1 and/or I2, its switching path S1 being located in series with at least one of the measuring resistors R.

Instead of switching paths of the crash sensor S1 mounted in the housing G, these switches S1 can however also additionally be switches S1 provided in the housing G, for example the processor P itself actuating this switch S1—or several such switches S1 —after it has detected the necessity of triggering. It is then a case of a firing control device whose housing G contains at least one crash sensor from whose output signals the processor P derives criteria. However, the housing G additionally contains one—or more—switches S1 which are controlled directly only by the processor P, but not directly by the crash sensor S1, switch the firing current I1 and/or I2, are located in series with at least one of the measuring resistors R and are connected to the terminals A1, A2 of the firing pellet/pellets Z1, Z2. In this further development, subsequent access to the crash sensor S1 mounted in the housing G or to the data stored by means of this crash sensor S1 is made particularly difficult for the person attempting to tamper.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A firing control device for triggering a passenger restraint system of a vehicle by electrically firing at least one firing pellet, comprising:
   at least one measuring unit which measures, during a crash, at least one value which depicts on a firing current flowing through a respective firing pellet;
   a measuring resistor in the measuring unit, which resistor is inserted into a firing circuit of the respective firing pellet in order to determine data relating to a variation of the firing current flowing across said resistor during triggering or data which is dependent thereon;
   a processor which, during operation, derives criteria for the necessity of triggering from output signals of at least one crash sensor;
   a memory, for storing specific data which is determined in the case of a crash and from which it can later be detected whether and how the passenger restraint system triggered during the crash, said memory storing
   at least some of the data determined which relate to the criteria derived by the processor during a crash,
   and at least some of the data determined by means of the measuring unit;
   the measuring resistor being inserted into a firing circuit of the respective firing pellet in such a way that it is not directly accessible from the outside via external terminals of a housing of the firing control device;
   the processor, the at least one measuring unit and the memory, but no firing pellet and also no explosive charge of the passenger restraint system, being mounted in the housing, wherein the housing survives a crash intact and cannot be opened without leaving behind detectable damage.

2. The firing control device as claimed in claim 1, wherein the housing has external electrical terminals, the external terminals being terminals of the power supply of at least the processor, the memory, the at least one measuring unit provided in the housing
   and being terminals via which the at least one firing pellet is the firing pellet/pellets fired,
   but not being terminals via which the data relating to a crash and stored in the memory can be falsified directly, or indirectly from outside the housing without leaving behind further data in the memory which indicates tampering.

3. The firing control device as claimed in claim 2, wherein the housing has at least one external processor terminal via which output signals of the at least one crash sensor, that is not mounted in the housing, are fed to the processor during operation in order to derive the criteria, a connection between a respective external processor terminal and the processor being immediately and permanently broken as soon as, after triggering, the processor no longer has to process any further output signals of the respective crash sensor before the stored data can be tampered with, the respective connection being therefore permanently broken by at most several second after triggering.

4. The firing control device as claimed in claim 3, wherein the connection between the external terminal and the processor is a means for protecting.

5. The firing control device as claimed in claim 3, wherein the connection between the external terminal and the processor is broken within approximately 0.1 second.

6. The firing control device as claimed in claim 1, wherein the housing contains at least one crash sensor from whose output signals the processor derives criteria, said crash sensor containing a switching path which is actuated by said crash sensor and which is located in series with at least one measuring resistor for switching the firing current.

7. The firing control device as claimed in claim 1, wherein
   after detection of the necessity of triggering the passenger restraint system, said processor actuates at least one switch which switches onthe firing current which flows through the respective firing pellet.

8. The firing control device as claimed in claim 7, wherein the housing contains at least one crash sensor from whose output signals the processor derives criteria, wherein
   the housing also contains at least one switch which is controlled directly and only by the processor, and not directly by the at least one crash sensor, which switches the firing current and which is located in series with at least one of the measuring resistors R.

9. The firing control device as claimed in claim 1, wherein
   the housing contains at least one firing capacitor stores electrical energy necessary for firing.

10. The firing control device as claimed in claim 1, wherein said memory is a programmable read only memory.

* * * * *